US010885649B2

(12) United States Patent
Helmore et al.

(10) Patent No.: US 10,885,649 B2
(45) Date of Patent: Jan. 5, 2021

(54) QUANTITATIVE SURFACE MEASUREMENTS BY COMBINING IMAGE AND HEIGHT PROFILE DATA

(71) Applicant: E.V. Offshore Limited, Norwich (GB)

(72) Inventors: Steven Helmore, Banchory (GB); Christopher Scott, Norwich (GB); Jonathan Thursby, Norwich (GB); Fraser Louden, Houston, TX (US)

(73) Assignee: E.V. OFFSHORE LIMITED, Norwich (GB)

( * ) Notice: Subject to any disclaimer, the term of this patent is extended or adjusted under 35 U.S.C. 154(b) by 159 days.

(21) Appl. No.: 16/307,694

(22) PCT Filed: Aug. 3, 2018

(86) PCT No.: PCT/GB2018/052226
§ 371 (c)(1),
(2) Date: Dec. 6, 2018

(87) PCT Pub. No.: WO2019/025812
PCT Pub. Date: Feb. 7, 2019

(65) Prior Publication Data
US 2020/0302625 A1    Sep. 24, 2020

(30) Foreign Application Priority Data

Aug. 3, 2017    (GB) .................................. 1712486.8

(51) Int. Cl.
*G06T 7/55*    (2017.01)
*G01B 5/20*    (2006.01)

(52) U.S. Cl.
CPC . *G06T 7/55* (2017.01); *G01B 5/20* (2013.01)

(58) Field of Classification Search
None
See application file for complete search history.

(56) References Cited

U.S. PATENT DOCUMENTS

| 2003/0198374 A1 | 10/2003 | Hagene et al. |
| 2006/0152589 A1 | 7/2006 | Morrison et al. |
| 2009/0207241 A1* | 8/2009 | Igarashi .................... G06T 7/55 |
| | | 348/68 |
| 2012/0257042 A1* | 10/2012 | McKaigue ........... G01N 21/954 |
| | | 348/84 |
| 2015/0229887 A1* | 8/2015 | Kisner ............... G02B 23/2484 |
| | | 348/84 |

FOREIGN PATENT DOCUMENTS

| AU | 2015200693 A1 | 3/2015 |
| CN | 105069751 A | 11/2015 |
| EP | 2813813 A1 | 12/2014 |

* cited by examiner

*Primary Examiner* — Leon Flores
(74) *Attorney, Agent, or Firm* — Hayes Soloway PC

(57) ABSTRACT

A method of constructing a three-dimensional model of an internal surface of a tubular structure comprises obtaining image data from an area of the internal surface of the structure, obtaining measured height profile data from the internal surface in a plurality of sub-regions of the area, for example using a multi-finger caliper tool, determining image properties from the image data, correlating the measured height profile data with the image properties in the sub-regions, and constructing expected height profile data for at least part of the area outside the sub-regions using the correlated measured height profile data and image properties.

15 Claims, 4 Drawing Sheets

QUANTITATIVE SURFACE MEASUREMENTS BY COMBINING IMAGE AND HEIGHT PROFILE DATA

FIELD OF THE INVENTION

This invention relates to the processing of image data using additional data from mechanical and/or electrical sensors to obtain quantitative measurements over an area of a surface. This invention has primary application in the monitoring of internal surfaces of pipes and conduits.

BACKGROUND TO THE INVENTION

It is known to make measurements of an internal surface of a pipe or conduit using a multi-finger caliper. A multi-finger caliper may be used as part of a logging tool, in particular in the oil and gas industry, to measure internal radii of tubulars and casings. As illustrated in FIG. 1, a caliper tool 10 comprises a plurality of members or fingers 12 that extend radially outwardly from a logging tool. Each finger 12 extends outwardly until it comes into contact with an internal surface 14 of a pipe 16 in which it is located. By determining the angle of the finger 12 with respect to the tool the radius of the pipe 16 at this position can be determined. The readings or measurements obtained using the multi-finger caliper can, therefore, be used to determine the internal diameter and internal shape of the conduit or pipe at a given measured depth as the tool moves through the pipe. The multi-finger caliper data can also be used to determine the depths of pits and heights of protrusions that may be present in the pipe or conduit.

Multi-finger calipers have a fixed number of fingers 12, commonly 24, 40, 56, 60 or 80 fingers, with individual caliper data values obtained for each finger 12. Each finger 12 can therefore provide an accurate measurement of the dimension of an inside surface of a structure, but at a low resolution around the circumference of the pipe, i.e. only a small proportion of the inside surface is contacted by a finger 12. This is illustrated in FIG. 2 which shows contacts points 18 for 24 fingers around an internal circumference of a pipe 16. In this example, if the pipe had an internal radius of 5.65 cm and each caliper finger had a width of 1.65 mm, the calliper fingers would cover only 11.15% of the surface of the pipe around its internal circumference.

In prior art systems, radius values for areas of the pipe between the caliper fingers have been established by linear interpolation of neighbouring caliper data values to obtain radius measurements over the complete area of the internal surface of the pipe. This method, however, may fail to identify smaller regions between the caliper fingers that may have a localised increase or decrease in radius compared to the surrounding pipe surface due to pitting/corrosion or deposition respectively.

It is also known to capture images of the internal surface of a pipe or conduit. These images may be captured using a downview or sideview camera on a logging tool, as is known in the art. Images obtained by downhole camera systems are captured using high resolution sensors, typically resulting in images with in the order of over ten pixels per square millimetre of pipe surface. Subsequent image processing of the captured images, to identify regions of similarity, can be used to identify the location of defects on a pipe surface, or patches of rust, for example. The images, however, provide little or no quantitative information regarding variations in radius of the pipe or changes in the depth of the surface being viewed due to pitting or corrosion for example.

Against that background, it would be desirable to provide methods for obtaining improved quantitative information relating to height and depth variations of the surface of the pipe.

SUMMARY OF THE INVENTION

From a first aspect, the present invention resides in a method of constructing a three-dimensional model of an internal surface of a tubular structure, comprising:
  obtaining image data from an area of the internal surface of the structure;
  obtaining measured height profile data from the internal surface in a plurality of sub-regions of the area;
  determining image properties from the image data; correlating the measured height profile data with the image properties in the sub-regions; and
  constructing expected height profile data for at least part of the area outside the sub-regions using the correlated measured height profile data and image properties.

The method therefore provides a way to obtain quantitative information about the three-dimensional shape of the internal surface outside those regions from which direct measurements of the shape of the surface have been obtained.

Correlating the measured height profile data with the image properties may comprise identifying one or more regions of similarity in the image data, at least one of the regions of similarity being at least partly coincident with at least one of the sub-regions. The measured height profile data obtained from the or each sub-region can then be correlated with the image properties in the or each coincident region of similarity to obtain a function relating the image properties to the measured height profile data. Constructing the expected height profile data may comprise applying the function to the image properties in the corresponding regions of similarity outside the or each sub-region.

Different functions may be determined for different regions of similarity. The regions of similarity may be contiguous or may be formed of two or more separate areas in the image. The regions of similarity may be determined by image analysis, and may for example be identified based on RGB values, intensity, pattern matching, and so on. The regions of similarity may be identified using the original image data, the image properties determined from the image data for correlation with the measured height profile data, or from other image properties derived from the image data.

Any suitable image properties can be determined from the image data for correlation with the measured height profile data. A single type of image property may be determined or two or more different types of image property may be determined.

In one example, determining the image properties from the image data comprises determining image gradients. Determining image gradients may comprise determining, for each of a plurality of pixels of the image, a change in intensity between that pixel and one or more neighbouring pixels.

In another example, the image data comprises a plurality of variant images of the same area, and determining the image properties from the image data comprises determining variations between the plurality of variant images. The variant images comprise images of the same area taken at different viewing angles or with different lighting angles or under different lighting conditions. In these cases, determining the image properties from the image data may comprise determining intensity variations between the plurality of variant images.

The method may comprise determining a depth position of the image data and a depth position of the measured height profile data, and correlating the measured height profile data with the image properties may comprise matching the depth position of the measured height profile data to the depth position of the image data.

In one example, the method includes obtaining a video stream from a camera tool as the camera tool moves through the structure. The image data may be obtained from the video stream. The video stream comprises a sequence of images taken at a predetermined frame rate. The method may comprise determining an overlap distance between each pair of successive images in the sequence of images, calculating, from the overlap distance and the frame rate, a speed of movement of the camera tool corresponding to each image, and determining, from the speed of movement of the tool, the depth position of the image data corresponding to each image.

The method may comprise obtaining the measured height profile data from a surface height sensor disposed on or connected to the camera tool, and determining, from the speed of movement of the camera tool, the depth position of the measured height profile data. The measured height profile data and the image data may be obtained at substantially the same time (i.e. during the passage of the tool or tool string through an area of interest in the structure). The surface height sensor may be disposed on a different tool, in which case the depth position of the measured height profile data may be determined in a different way.

The measured height profile data may be obtained from a set of calipers. For example, the measured height profile data may be obtained using a multi-finger caliper tool.

The spatial resolution of the expected height profile data is preferably greater than the spatial resolution of the measured height profile data. For example, the spatial resolution of the expected height profile data may be substantially equal to the spatial resolution of the image data.

A method according to the present invention combines image data from video or still images with caliper data from a multi-fingered caliper tool. The image data and caliper data is captured within a pipe or conduit and is used to generate a 2D or 3D quantitative model of the internal surface of the pipe or conduit.

It is envisaged that this method will find particular application in the real-time or post-processing of downhole video camera images from surface or subsurface pipes in the oil and gas industry. The data assimilated and generated by the method may be used for precision correlation of measured corrosion pitting with observed pitting in camera images. The data may be used to identify micro sized pits. Furthermore, the method may be used for time lapse monitoring of corrosion/erosion, deposits/obstructions, milling/clean-up, damage/wear/buckling, perforations/sleeve or screen damage.

The method provides a way of measuring pitting across the entire circumference of the pipe, without being restricted by the limited circumferential coverage of caliper fingers.

In a second aspect, the method comprises obtaining image data from an area of an internal surface of a pipe or conduit, obtaining height profile data from the internal surface in a sub-region of the area, identifying, in the image data, regions of similarity, determining one or more image properties inside the regions of similarity, correlating the height profile data with the image properties inside the regions of similarity, and based on the correlations, using the image properties to construct height profile data outside the sub-region of the surface.

In a third aspect, the method comprises obtaining image data from an area of an internal surface of a pipe or conduit, obtaining height profile data from the internal surface in a sub-region of the area, identifying, in the image data, regions of similarity, and using the height profile data from the sub-region of the area to construct a height profile for the area outside the sub-region based on the regions of similarity.

Throughout this specification, the term "height" is used to refer to the deviation of the internal surface of the tubular structure from a regular cylindrical or otherwise smooth surface. For example, a region of the surface that projects towards the centreline of the tubular structure, resulting in a locally decreased radius, can be taken to have a positive height, while a region of the surface that is eroded or pitted, resulting in a locally increased radius, can be taken to have a negative height. It will be appreciated that the height of the surface could instead be expressed simply as a local radius of the structure.

The term "tubular structure" should be construed broadly, and includes substantially any downhole structure having a bore into which a tool could be passed. Examples include wellbores, well casings, boreholes, pipes, conduits and so on, as may be typically used in oil and gas production. The term "tubular" should likewise be construed broadly, and includes structures having a generally tubular form; such structures may be axially straight or bent, twisted or otherwise deformed, and may have a bore with a non-circular cross-section. The invention is particularly useful when applied to downhole tubular structures, but the method is not limited to downhole structures and could be applied equally to surface or underwater structures.

BRIEF DESCRIPTION OF THE DRAWINGS

Embodiments of the present invention will now be described, by way of example only, with reference to the accompanying drawings, in which like reference numerals are used for like features, and in which.

DETAILED DESCRIPTION OF EMBODIMENTS OF THE INVENTION

The method of the present invention combines images of an internal surface of a pipe or conduit with physical surface height measurement data to obtain a higher resolution 3D model of the internal surface of the structure than that obtainable from the measurement data alone.

Figure 1:
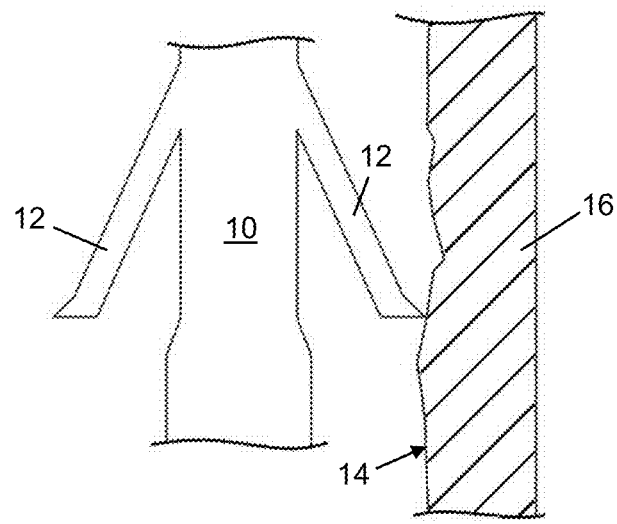
FIG. 1 illustrates contact of a finger of a multi-finger caliper tool with part of an internal surface of a conduit having a varying internal diameter.
Figure 2:
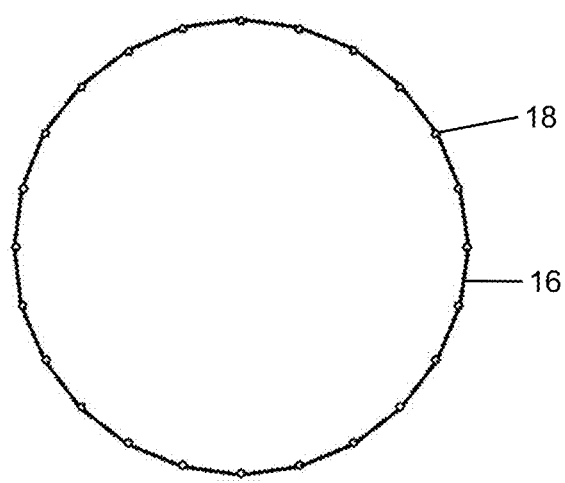
FIG. 2 illustrates contact points of a multi-finger caliper around a circumference of an internal surface of a pipe.

In one embodiment, the method therefore comprises obtaining an image of an area of the internal surface of a downhole structure using a downhole logging tool equipped with a camera, and measuring the height profile of the internal surface within sub-regions of the imaged area, for example using a multi-fingered caliper tool of the type shown in FIGS. 1 and 2.

Accordingly, caliper data corresponding to measurements of the internal diameter or radius of the pipe are captured using the multi-finger caliper tool. The caliper tool may be located on the same logging tool as the camera or may be disposed on a separate, different logging tool. Each finger of the multi-finger caliper tool provides a set of caliper data values that correspond to measurements made as the finger moves longitudinally through the pipe, resulting in a set of angularly-spaced linear strips of measured height profile data.

Figure 3:
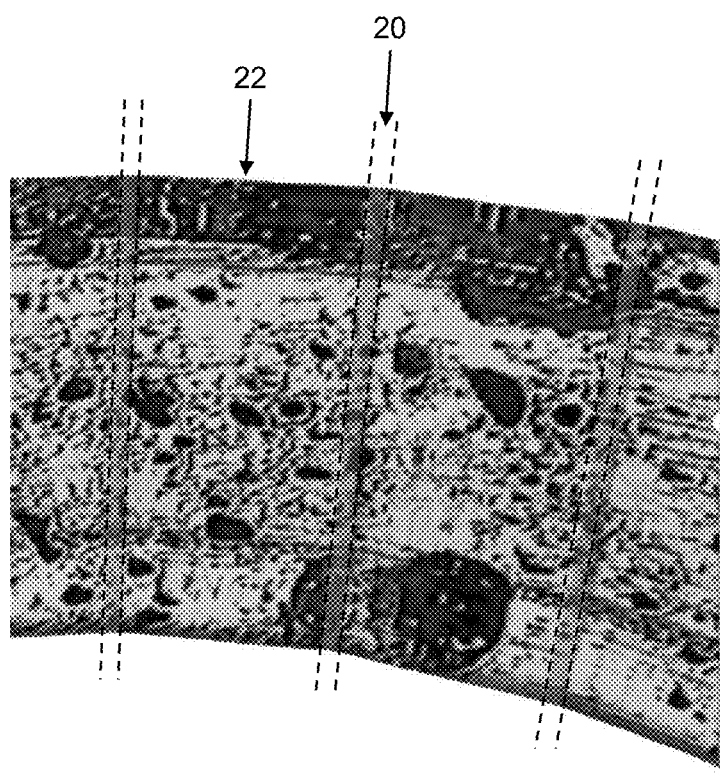
FIG. 3 shows an image of an internal surface of a pipe having areas of pitting and corrosion, with three linear paths overlaid indicating the locations of measurements by three fingers of a multi-finger caliper tool.

The caliper data is then aligned with the image, such that the strips of linear caliper data 20 are effectively overlaid onto the image 22 as illustrated in FIG. 3.

It is then possible to correlate the measured height profile data with the image data in order to construct expected height profile data for parts of the internal surface that lie outside the sub-regions of the imaged area for which measured height profile data has been obtained. By correlating the measured height profile data with image properties derived from the image data, a substantially improved model of the internal surface of the structure can be obtained compared to simply extrapolating the measured height profile data.

In one embodiment, the method uses image processing techniques to identify parts of the image between the strips that can be expected to correspond in surface height to parts of the image within the strips, so that the physical measurement data can be extrapolated to provide a higher resolution model of the surface height of the structure across the whole image or across a particular segment or region of interest within the image. In this way, a region of the image for which no measurement data is available can be matched to a similar region of the image for which physical measurement data is available, allowing expected height profile data to be calculated using the relationships established during correlation.

Figure 4:
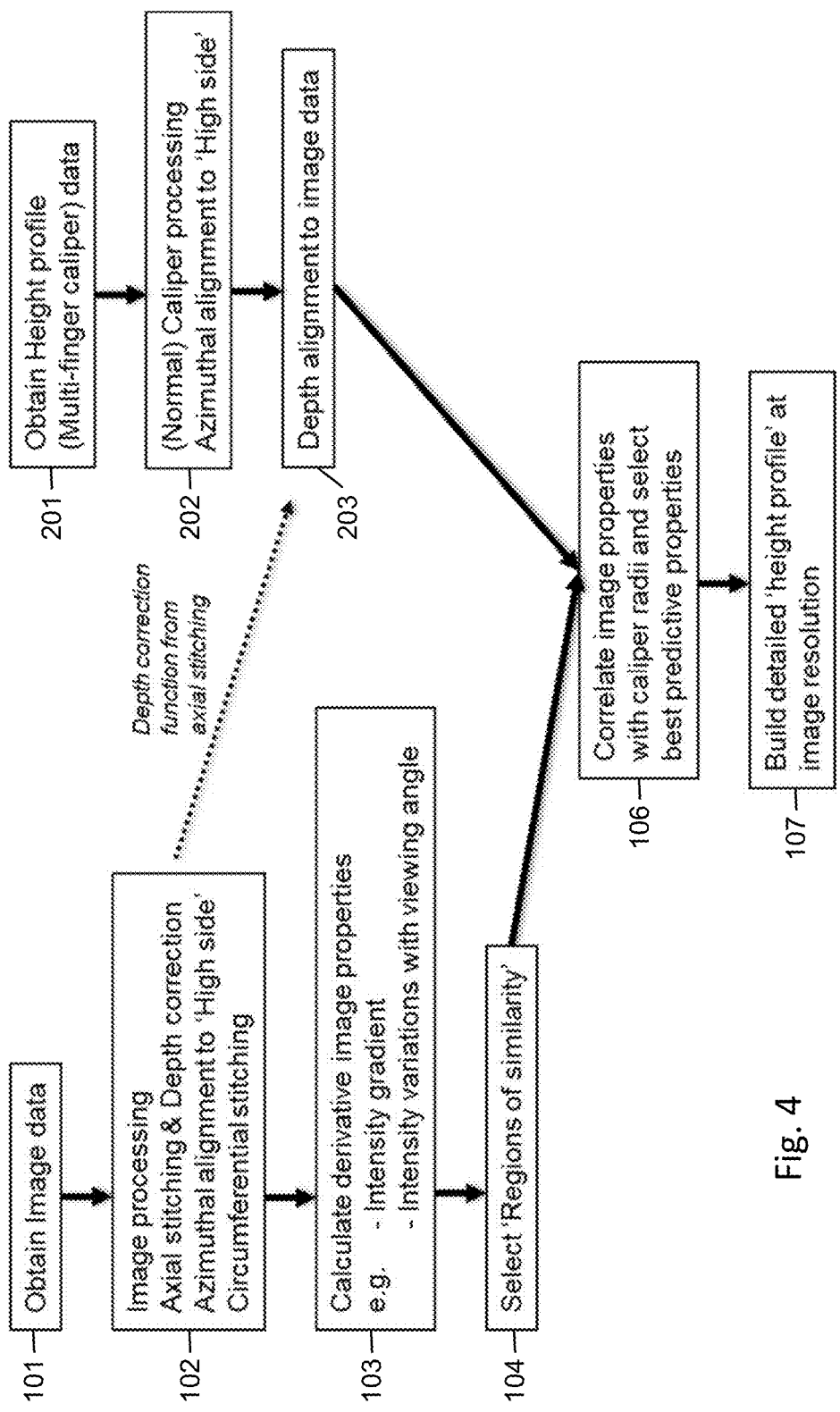
FIG. 4 is a flowchart showing steps in a method according to the invention.
Figure 5:
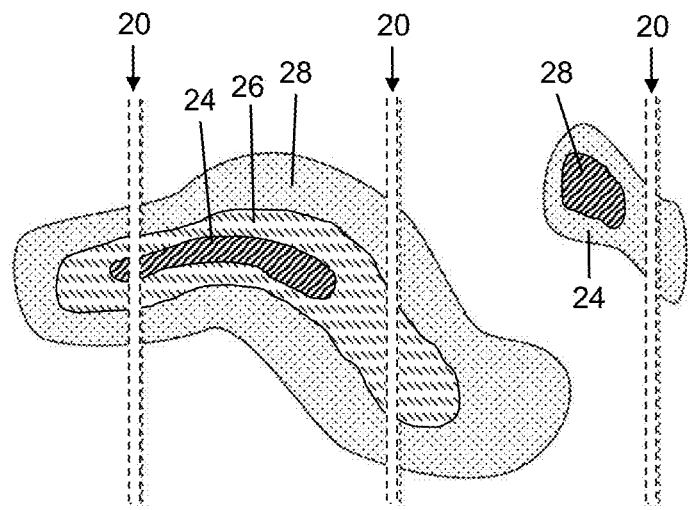
FIG. 5 illustrates regions of similarity in an image with paths of fingers of a multi-finger caliper overlaid.

One example of the method will now be described in more detail with reference to FIG. 4.

In a first step 101, images of the internal surface of a pipe are captured as a downhole logging tool or camera tool moves through the pipe. In this example, the images are frames of a video stream.

In step 102, the images and related information are processed to produce image data corresponding to an area of the internal surface of the structure.

For example, overlapping frames of the video can be aligned and stitched together to form a composite image of the area of interest. The amount of axial overlap between video frames gives an estimate of the axial movement and speed of the logging tool, allowing for the depth at which each frame was captured to be determined or corrected.

In particular, the video stream consists of a series of images taken at a predetermined frame rate. By comparing successive images in the video stream, an overlap distance between each pair of successive images can be determined. This comparison can be made using any suitable image analysis technique, as will be familiar to those skilled in the art. The speed of movement of the camera tool at the time at which each image in the video stream was captured can then be calculated or estimated from knowledge of the overlap distance and the frame rate. The depth position of the image data corresponding to each image can then be determined by integrating the speeds with respect to image capture time. The depth position can for example be expressed as a distance from a known point in the structure, such as the top of the structure or an identifying point disposed along the structure.

The depth position of the image data could be verified or alternatively determined by reference to a depth reading of the logging tool, which may be obtained from surface depth measurements, a timestamped depth encoder, or via onboard accelerometer and gyrometer data, as is known in the art.

A further processing step that may be included in step 102 is circumferential stitching of the images, to provide image data over an area that exceeds the circumferential angle of view of the camera, preferably around the whole circumference of the structure.

The processing in step 102 may also include azimuthal alignment of the image data, to correct for the tool (and therefore the camera or cameras) being imperfectly aligned with the vertical or with the axis of the structure. The azimuthal alignment of the tool can be determined for example using a "high side" detector of the tool, which indicates the azimuth of the tool that is uppermost at any time, and a suitable correction factor can be applied to the image data.

Similarly, the image data may be corrected in step 102 to account for non-concentricity of the tool.

Step 102 may also involve the application of various image processing techniques such as are known in the art to improve contrast, enhance or correct colours, remove noise, and so on.

The output of step 102 is a set of corrected and aligned image data relating to an area of the internal surface of the structure at a known position.

At step 103, one or more derivative image properties are calculated from the image data. For example, an intensity gradient may be calculated for each pixel in the image by determining the change in intensity between the subject pixel and one or more neighbouring pixels, with each pixel corresponding to a particular location on the internal surface of the structure. The rate of change of intensity gradient could also be calculated in step 103.

In another example, a plurality of sets of image data are available for the same area, for instance as a result of axially overlapping video frames or circumferentially overlapping images from a multiple-camera tool. The sets of image data will differ due to the differences in viewing angle from which the area was imaged. It is therefore possible, in step 103, to calculate the difference in image intensity for each location on the internal surface as a result of different viewing angles.

In a further example, a plurality of sets of image data are available for the same area in which set of image data has been derived from images taken under different lighting conditions, such as different lighting angles. In this case, in step 103, the difference in image intensity is calculated for each location on the internal surface as a result of different lighting angles.

At step 104, the image property data is analysed to identify regions of similarity. FIG. 4 shows an area of the surface of the structure with the position of three strips 20 from which caliper data has been obtained. Regions of similarity 24, 26, 28 have been identified in the image property data. The like-shaded and like-numbered regions are corresponding regions of similarity. Within each region of similarity, and in corresponding regions of similarity, the height of the surface can be expected to be constant or to follow a functional relationship with one or more of the derivative image properties calculated in step 103.

The regions of similarity may be identified by analysis of the derivative image properties calculated in step 103. Alternatively, or in addition, the regions of similarity may be identified by analysis of other image properties, such as RGB values, intensity/brightness, and so on, or by image analysis techniques.

Algorithms that detect regions of similarity in the image property data have been developed based on the following categorisation techniques in various combinations to improve the level of confidence:

- Grouping pixels together via similarity (in, for example, RGB values and/or brightness) to reference pixel values corresponding to known or expected features of interest. For example, a range of RGB values corresponding to rust.
- Pattern matching known reference patterns, such as pitting. This is done, for example, using an Eigenspace of reference patterns, providing a dataset of prominent features of the reference patterns under different conditions (exposure, lighting, fluid clarity, materials). The reference patterns are then used to search the image, and correct matches that fall within a threshold structural similarity measure are then tagged. Regions of similarity can be identified with cross correlation with the reference images.
- Image segmentation and blob analysis can be used to identify regular small features of interest that may correspond, for example, to intrusions into the structure that signifies pitting.

If a feature of interest spans more than one image, then multiple images may be stitched together using known image processing techniques to determine the full extent of the feature of interest (and hence the corresponding region of similarity) over the surface of the pipe.

The features of interest may, for example, correspond to corrosion pitting, erosion, deposits, obstructions, milling features, damage, wear, buckling or perforations.

Processing of the image data to perform depth corrections, alignments and so on in step 102, to calculate image properties in step 103, and/or to determine regions of similarity in step 104 may occur in real time in the logging tool, or the raw images may be stored in a memory of the logging tool and/or transmitted to a remote station for post processing.

Returning to FIG. 4, in step 201, physical measurements of the local radius of the structure are obtained using a multi-finger caliper tool, for example by performing a caliper survey as known in the art.

At step 202, the raw data from the caliper survey is processed to correct for azimuthal alignment, eccentricity of the tool and other factors as is generally known in the art. The resulting measured height profile data comprises a plurality of sets of axially-spaced height readings taken along the linear strips 20 of the surface, with each strip being angularly spaced from its neighbours.

At step 203, the measured height profile data is aligned with the image data, so that the height profile data can be correctly correlated with the image data. If the caliper tool and camera are mounted on the same logging tool or tool string, then the tool position determined in step 102 by analysis of axially overlapping images can be used to determine the depth position of each of the height profile data points.

If the caliper tool is not mounted on the same tool as the camera, independent depth readings from the caliper tool survey can be used to determine the depth position of each of the measured height profile data points.

At step 106, the height profile data determined from the caliper measurement is correlated with one or more of the image properties within the regions of similarity that coincide with the strips or sub-regions of the imaged area for which the height profile data is available. Thus, for a plurality of locations on the surface within each strip, a measured height profile data point can be matched to the image properties derived for from the image data at the corresponding location. A relationship function relating the image properties to the measured height profile data is then determined for each region of similarity.

At step 107, expected height profile data is calculated for regions of the imaged area that lie outside the strips or sub-regions. Within each region of similarity, the corresponding relationship function is applied to the image properties for each pixel of the image to output an expected height value. In this way, an expected height value can be obtained that corresponds to each pixel in an area of interest of the image, resulting in the expected height profile data having being substantially higher spatial resolution than the measured height profile data obtained from the caliper survey.

Figure 6:
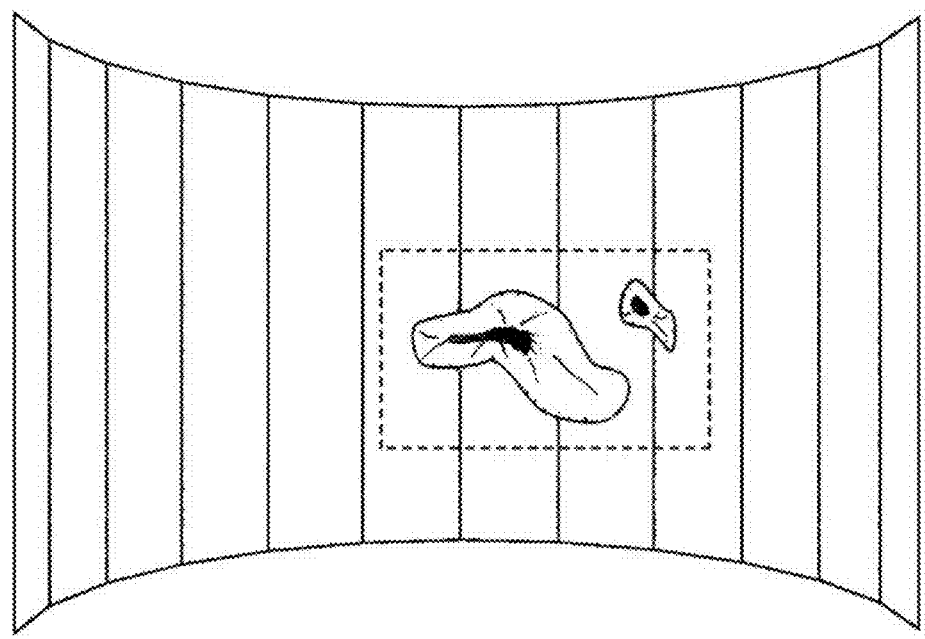
FIG. 6 illustrates a partial 3D model created by combining 2D image data from the image of FIG. 5 and linear measurements from a multi-finger caliper tool.

Accordingly, by obtaining measurements from caliper fingers, which provide accurate measurements along a relatively thin longitudinal slice of the structure, and correlating them with the features identified by image processing of the captured camera images, a 3D model may be created which accurately represents the surface morphology of the internal surface of the pipe over the complete internal area, as shown in FIG. 6. In particular, the method may be used to construct a quantitative map or model of pitting and other surface defects and their severity across the full area of the surface of the pipe rather than just in the relatively thin longitudinal regions covered by caliper data alone.

When assigning height profile data values to a region of similarity that is not intersected by the path of a caliper finger, it is preferable to use data values from the nearest caliper finger intersecting a corresponding region of similarity. This ensures that the caliper data value applied to each region of similarity has the most accurate value based on the actual caliper data obtained from measurements in that region of the pipe.

The quantitative area coverage data provided by correlating the results of the image processing with the caliper data provides far more accurate three dimensional data over the surface of a pipe than a traditional linear interpolation of the caliper data would provide. Furthermore, simple linear interpolation may also completely miss small pitting areas which exist between caliper fingers and which are not contacted by the caliper fingers, or pitting areas that have smaller dimensions than the tip of the caliper finger is able to access.

Where areas of pitting have been identified in an image, the visual characteristics of this section of the image can be noted—for instance, the characteristics of the image area relating to the maximum radius or local maxima—and this severity of pitting can be interpolated to cover similar areas adjoining the caliper trace area.

It will be appreciated that, in order to apply caliper data values consistently across multiple images, the images can be processed to account for fluid clarity and uneven or different lighting conditions. Additional processing of the images may be used to identify and remove features corresponding to fluid particulates, that might otherwise be mistaken for features on the surface of the pipe or conduit.

It will also be appreciated that post processing of an image may need to account for the logging tool not being located centrally in the pipe or conduit when the image was captured. This is required to more accurately determine the circumferential or longitudinal dimensions of a defect or feature, which may otherwise be considered to be smaller than in reality if the camera lens is further from that region of the surface of the pipe or larger if the camera lens is nearer to that region of the surface of the pipe.

The method allows different relationship functions to be assigned to different regions of similarity, thus improving the accuracy of the expected height profile data. It is however conceivable that the step of identifying regions of similarity could be omitted, and a single relationship function derived between the measured height profile data and the image property data across the whole of the area of interest.

One example of a possible relationship function is a proportional relationship between the measured height profile data points and the magnitude of the intensity gradient of the image. Another example is a proportional relationship between the measured height profile data points and the magnitude of the difference in image intensity between images of the same location obtained at different viewing angles. Various other relationship functions, involving different image properties, can be conceived. In an embodiment, the method includes determining, for each region of similarity or for the whole area, a plurality of relationship functions, each function relating the measured height profile data to a different image property. The fit of the measured data to each function can be assessed statistically and the "best" function selected for subsequent calculation of the expected height profile data.

It is envisaged that the method of the invention has specific applications when analysing pipes and tubulars for pitting and monitoring the extent of corrosion. Utilising the information generated from this method can provide more accurate corrosion measurements and can thereby provide a more accurate estimation of metal loss from a pipe, casing or other structure. This in turn can be used to provide a more accurate estimation of pressure limitations of the corroded, damaged, worn or otherwise weakened structure.

Furthermore, the method of the present invention may be used to monitor evolution of corrosion or pitting of a pipe surface over time, by directly comparing image and caliper data collected at specified time points. In this way, specific features of interest may be automatically categorised and detected. With this information, a point cloud can be calculated and used to generate an accurate 3D model of the pipe surface with automatically annotated regions of concern.

It will be appreciated that, while the above description concerns the use of measurements obtained by a multi-finger caliper tool, in other embodiments image data may be combined with data obtained from other mechanical or electrical sensors. Importantly, the mechanical or electrical sensors provide quantitative data or measurements relating to a physical property of the pipe surface that is not obtainable through image processing of the captured 2D images of the pipe internal surface, but the mechanical or electrical sensors measure the physical property only over a limited area of the surface of the pipe.

Although the image data required can most conveniently be obtained from video data captured as a tool moves through the structure, it will be understood that the image data could instead be derived from one or more still images of the internal surface of the structure.

Other modifications and variations not explicitly disclosed above may also be contemplated without departing from the scope of the invention as defined in the appended claims.

The invention claimed is:

1. A method of constructing a three-dimensional model of an internal surface of a tubular structure, comprising:
   obtaining image data from an area of the internal surface of the tubular structure;
   obtaining measured height profile data from the internal surface in a plurality of sub-regions of the area;
   determining image properties from the image data;
   correlating the measured height profile data with the image properties in the sub-regions; and
   constructing expected height profile data for at least part of the area outside the sub-regions using the correlated measured height profile data and image properties, wherein a spatial resolution of the expected height profile data is greater than a spatial resolution of the measured height profile data.

2. The method according to claim 1, wherein correlating the measured height profile data with the image properties comprises:
   identifying one or more regions of similarity in the image data, at least one of the regions of similarity being at least partly coincident with at least one of the sub-regions; and
   correlating the measured height profile data obtained from the or each sub-region with the image properties in the or each coincident region of similarity to obtain a function relating the image properties to the measured height profile data.

3. The method according to claim 2, wherein constructing the expected height profile data comprises applying the function to the image properties in the corresponding regions of similarity outside the or each sub-region.

4. The method according to claim 1, wherein determining the image properties from the image data comprises determining image gradients.

5. The method according to claim 4, wherein determining image gradients comprises determining, for each of a plurality of pixels of the image, a change in intensity between that pixel and one or more neighbouring pixels.

6. The method according to claim 1, wherein the image data comprises a plurality of variant images of the same area, and wherein determining the image properties from the image data comprises determining variations between the plurality of variant images.

7. The method according to claim 6, wherein the variant images comprise images of the same area taken at different viewing angles.

8. The method according to claim 6, wherein the variant images comprise images of the same area taken at different lighting angles.

9. The method according to claim 6, wherein determining the image properties from the image data comprises determining intensity variations between the plurality of variant images.

10. The method according to claim 1, comprising determining a depth position of the image data and a depth position of the measured height profile data, and wherein correlating the measured height profile data with the image properties comprises matching the depth position of the measured height profile data to the depth position of the image data.

11. The method according to claim 10, comprising:
obtaining a video stream from a camera tool as the camera tool moves through the structure, the video stream comprising a sequence of images taken at a predetermined frame rate;
determining an overlap distance between each pair of successive images in the sequence of images;
calculating, from the overlap distance and the frame rate, a speed of movement of the camera tool corresponding to each image; and
determining, from the speed of movement of the tool, the depth position of the image data corresponding to each image.

12. The method according to claim 11, comprising:
obtaining the measured height profile data substantially simultaneously with the image data from a surface height sensor disposed on or connected to the camera tool;
determining, from the speed of movement of the camera tool, the depth position of the measured height profile data.

13. The method according to claim 1, comprising obtaining the measured height profile data from a set of calipers.

14. The method according to claim 1, wherein the spatial resolution of the expected height profile data is substantially equal to a spatial resolution of the image data.

15. A method of constructing a three-dimensional model of an internal surface of a tubular structure, comprising:
obtaining image data from an area of the internal surface of the tubular structure;
obtaining measured height profile data from the internal surface in a plurality of sub-regions of the area;
determining image properties from the image data;
correlating the measured height profile data with the image properties in the sub-regions;
constructing expected height profile data for at least part of the area outside the sub-regions using the correlated measured height profile data and image properties;
determining a depth position of the image data and a depth position of the measured height profile data, and wherein correlating the measured height profile data with the image properties comprises matching the depth position of the measured height profile data to the depth position of the image data;
obtaining a video stream from a camera tool as the camera tool moves through the structure, the video stream comprising a sequence of images taken at a predetermined frame rate;
determining an overlap distance between each pair of successive images in the sequence of images;
calculating, from the overlap distance and the frame rate, a speed of movement of the camera tool corresponding to each image; and
determining, from the speed of movement of the tool, the depth position of the image data corresponding to each image.

* * * * *